United States Patent
Schultz

(10) Patent No.: US 7,454,712 B2
(45) Date of Patent: Nov. 18, 2008

(54) METHOD, SYSTEM, AND COMPUTER PROGRAM PRODUCT FOR PREVENTING UNWANTED APPLICATION BEHAVIOR

(75) Inventor: Dale M. Schultz, Chelmsford, MA (US)

(73) Assignee: International Business Machines Corporation, Amrmonk, NY (US)

( * ) Notice: Subject to any disclaimer, the term of this patent is extended or adjusted under 35 U.S.C. 154(b) by 478 days.

(21) Appl. No.: 11/183,493

(22) Filed: Jul. 18, 2005

(65) Prior Publication Data

US 2007/0016876 A1 Jan. 18, 2007

(51) Int. Cl.
G06F 3/048 (2006.01)
(52) U.S. Cl. ...................... 715/802; 715/808
(58) Field of Classification Search .......... 715/790, 715/794, 796, 802
See application file for complete search history.

(56) References Cited

U.S. PATENT DOCUMENTS

| | | | |
|---|---|---|---|
| 5,715,415 A * | 2/1998 | Dazey et al. ............ | 715/708 |
| 5,721,849 A * | 2/1998 | Amro .................... | 715/802 |
| 6,766,475 B2 | 7/2004 | Segal et al. | |
| 6,801,227 B2 | 10/2004 | Bocionek et al. | |
| 6,873,316 B2 * | 3/2005 | Tichy et al. ............ | 345/157 |
| 7,237,123 B2 * | 6/2007 | LeVine et al. .......... | 713/193 |
| 2001/0012976 A1 * | 8/2001 | Menig et al. ........... | 701/1 |
| 2004/0140901 A1 * | 7/2004 | Marsh .................... | 340/574 |

OTHER PUBLICATIONS

Swift et al., "Improving the Reliability of Commodity Operating Systems", ACM Transactions on Computer Systems, vol. 23, No. 1, Feb. 2005, pp. 77-110.

Terry et al., "Side Views: Persistent, On-Demand Previews for Open-Ended Tasks", UIST'02, Oct. 27-30, 2002, Paris, France, vol. 4, Issue 2, pp. 71-80.

* cited by examiner

Primary Examiner—Stephen Hong
Assistant Examiner—Omar Abdul-Ali
(74) Attorney, Agent, or Firm—Steven Kurlowecz; Hoffman Warnick LLC

(57) ABSTRACT

The present invention provides a method, system, and computer program product for preventing unwanted application behavior. A method in accordance with an embodiment of the present invention includes: determining when a window assumes a focus of a user interface; and preventing predetermined user input from being applied to the window for a predetermined period of time after the window assumes focus.

14 Claims, 3 Drawing Sheets

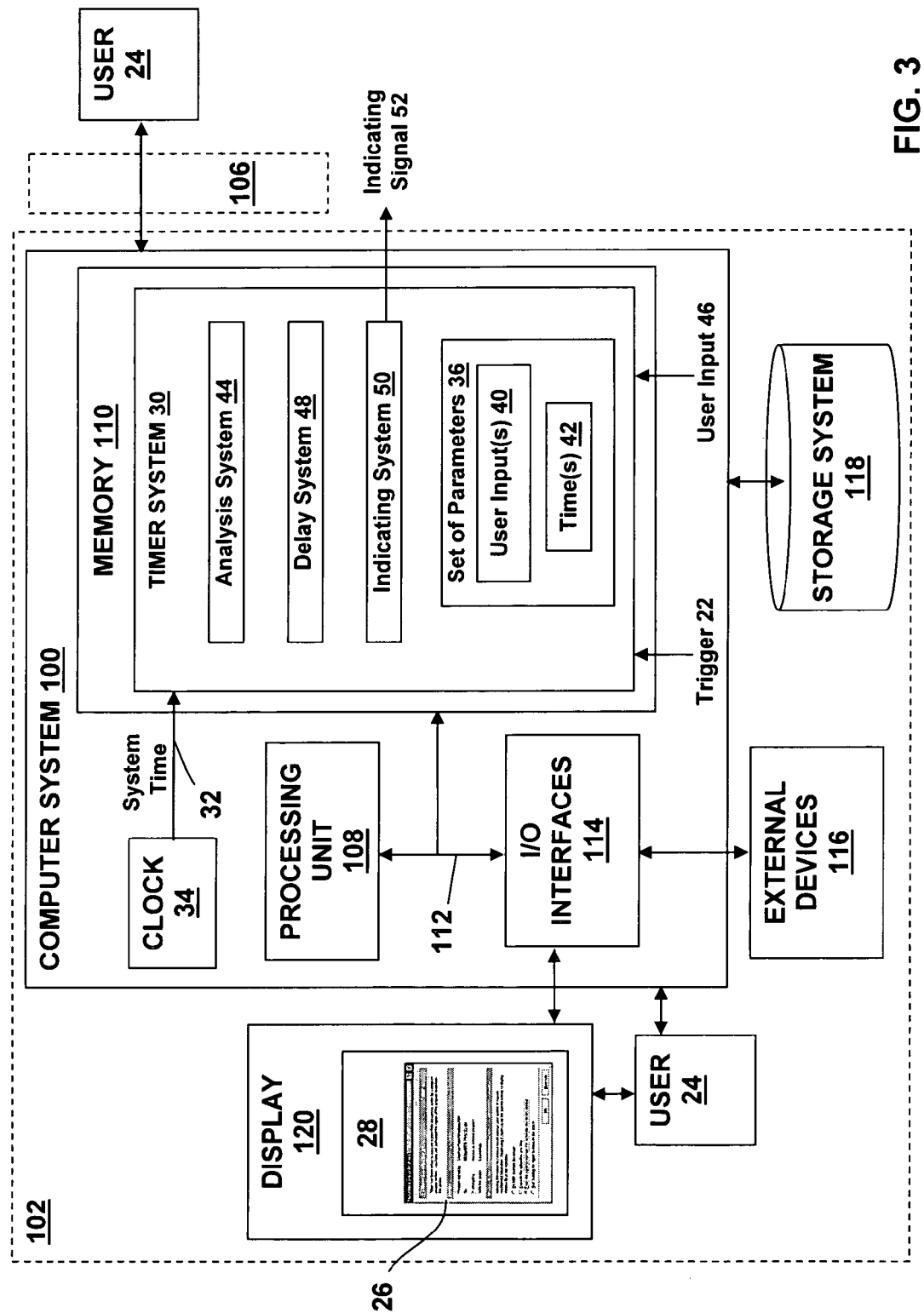

US 7,454,712 B2

METHOD, SYSTEM, AND COMPUTER PROGRAM PRODUCT FOR PREVENTING UNWANTED APPLICATION BEHAVIOR

BACKGROUND OF THE INVENTION

1. Field of the Invention

The present invention generally relates to graphical user interfaces, and more specifically relates to a method, system, and computer program product for preventing unwanted application behavior.

2. Related Art

Modem software makes extensive use of windowed graphical user interfaces (GUIs) in which windows may pop up on a user's display as a result of a user operation, a background event, or other type of trigger. For example, an application may encounter an error and open a window containing an error message on the user's display or an instant messaging application may open a new chat window on the user's display when a remote user initiates a chat. The newly opened window often assumes the focus of the user interface and becomes the active application from the user's point of view. One problem with this is that the user is not always aware that one of these windows is about to open and a user input action such as typing or pressing the Escape or Enter key may be part of the user's current activity when the new window opens. This often results in a user input action being performed on the new window instead of the application window that the user was previously using. Unfortunately, these actions may be extremely undesirable in the new window. For example, if the user happens to be pressing the Escape key when a new instant message window pops up, the new window may be dismissed without the user having time to see who it was from or what it contained. This problem is becoming particularly prevalent with the increased usage of instant messaging. Not only is this annoying to the user, but the remote chat partner may have no idea that the window was closed and may wait indefinitely for a response. As another example, if the user happens to be pressing the Enter key and a new dialog box pops up, the user may inadvertently execute a default button in the dialog box, resulting in the unwanted execution of an unknown command (e.g., delete file, empty trash, reformat drive, execute program, etc).

SUMMARY OF THE INVENTION

In general, the present invention provides a method, system, and computer program product for preventing unwanted application behavior. In particular, the invention ignores predetermined user input for a predetermined period of time after a window receives focus to prevent an unwanted (e.g., undesirable, unintentional, accidental, etc.) action from being performed by the user. For example, an instant messaging pop up chat window can employ the invention to prevent the window from being closed (e.g., in response to the actuation of the Escape key) before the user has time to perceive that a chat window has been displayed. The period of time and user input to be ignored are variable and can be determined based on user preferences, application requirements, and many other factors.

A first aspect of the present invention is directed to a method for preventing unwanted application behavior, comprising: determining when a window assumes a focus of a user interface; and preventing predetermined user input from being applied to the window for a predetermined period of time after the window assumes focus.

A second aspect of the present invention is directed to a system for preventing unwanted application behavior, comprising: a system for determining when a window assumes a focus of a user interface; and a system for preventing predetermined user input from being applied to the window for a predetermined period of time after the window assumes focus.

A third aspect of the present invention is directed to a program product stored on a computer readable medium for preventing unwanted application behavior, the computer readable medium comprising program code for performing the following steps: determining when a window assumes a focus of a user interface; and preventing predetermined user input from being applied to the window for a predetermined period of time after the window assumes focus.

A fourth aspect of the present invention is directed to a method for deploying an application for preventing unwanted application behavior, comprising: providing a computer infrastructure being operable to: determine when a window assumes a focus of a user interface; and prevent predetermined user input from being applied to the window for a predetermined period of time after the window assumes focus.

A fifth aspect of the present invention is directed to a computer software embodied in computer readable medium for preventing unwanted application behavior, the computer software comprising instructions to cause a computer system to perform the following functions: determine when a window assumes a focus of a user interface; and prevent predetermined user input from being applied to the window for a predetermined period of time after the window assumes focus.

BRIEF DESCRIPTION OF THE DRAWINGS

These and other features of this invention will be more readily understood from the following detailed description of the various aspects of the invention taken in conjunction with the accompanying drawings in which:

FIG. 3 depicts an illustrative computer system for implementing an embodiment of the present invention.

Figure 1:
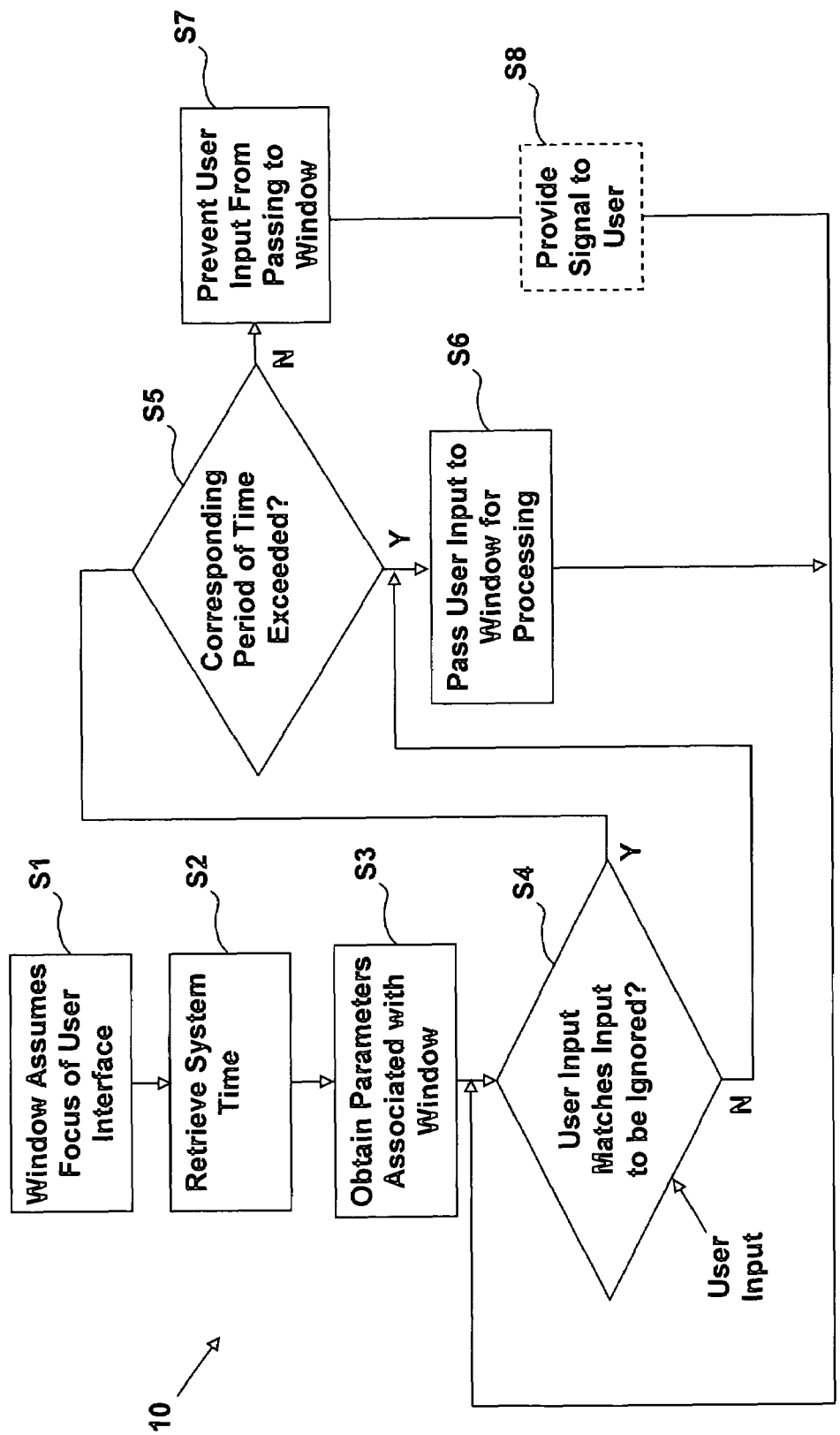
FIG. 1 depicts a flow diagram of a method for preventing unwanted application behavior in accordance with an embodiment of the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Figure 2:
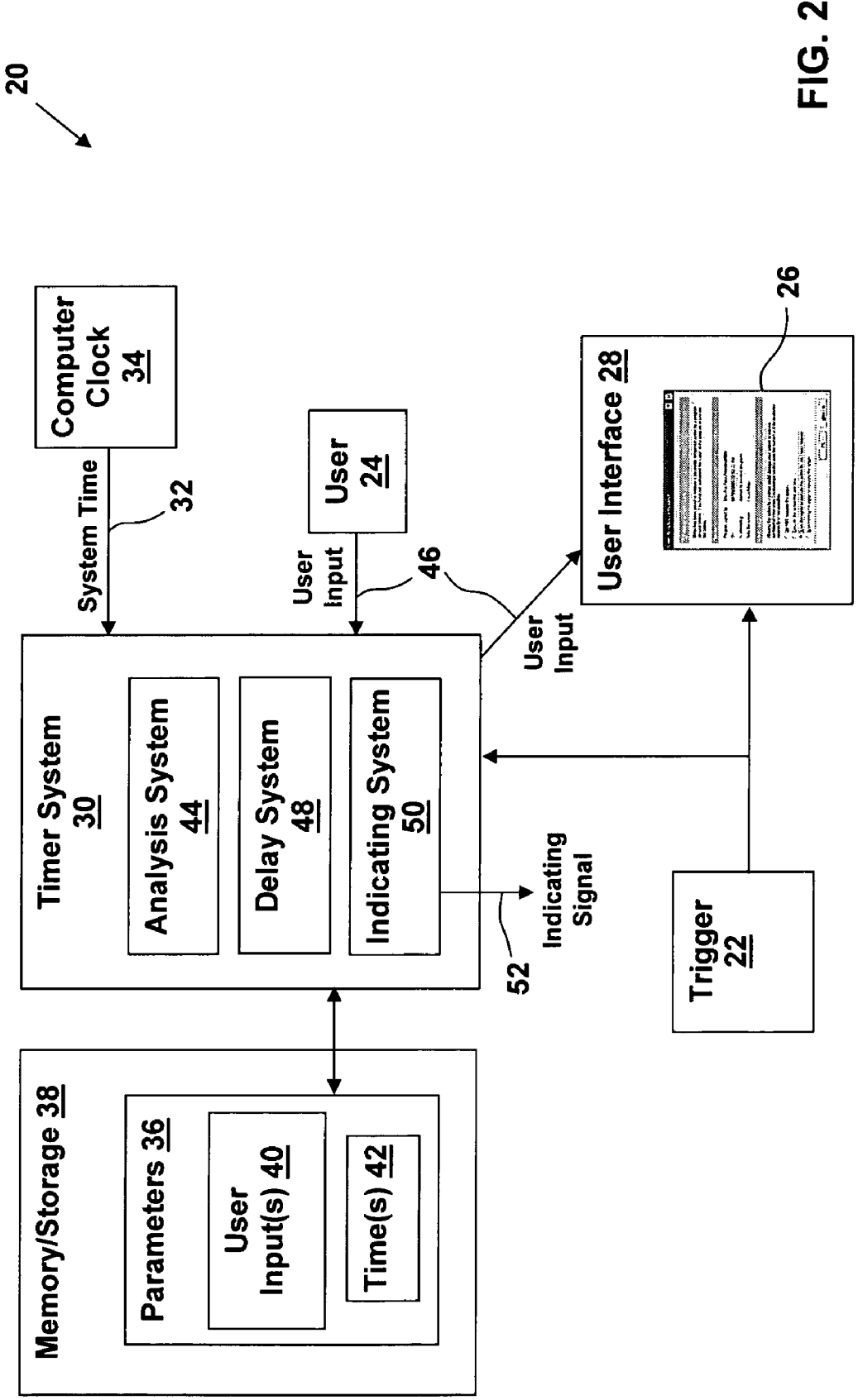
FIG. 2 depicts an illustrative system for implementing a method for preventing unwanted application behavior in accordance with an embodiment of the present invention.

A flow diagram 10 of a method for preventing unwanted application behavior in accordance with an embodiment of the present invention is depicted in FIG. 1. The flow diagram 10 is described below in conjunction with the components of the illustrative system 20 depicted in FIG. 2.

In step S1, a trigger 22 (other than a user 24) associated with the appearance or new focus of a window 26 in a user interface 28 is detected. The trigger 22 can be provided by an application, an operating system, or in any other now known or later developed manner. The present invention can be instantiated on or in response to the display of a new window 26, and can be activated any time a window 26 assumes focus as the result of a non-user initiated event (i.e., the present invention is directed to those windows whose sudden appearance is not predictable by a user). This can include, for example, some error messages, alerts, instant messaging chat sessions, etc. Thus, the present invention would not be activated if the user 24 intentionally switches to the window 26, since the new focus of the window 26 is not "unexpected."

In step S2, a timer system 30 retrieves the current system time 32 from a computer clock 34 or the like in response to the trigger 22. In step S3, the timer system 30 obtains a set of parameters 36 associated with the window 26. The set of parameters 36 can be retrieved from memory/storage 38 or provided in any other suitable manner. The set of parameters 36 includes a set (i.e., one or more) of predefined user inputs 40 to be ignored and the period of time 42 each user input 40 is to be ignored. In accordance with the present invention, a user input 40 can comprise any now known or later developed type of input generated by a user including, for example, keyboard input, mouse/pointer clicks, voice input, etc. The same period of time 42 can be associated with each user input 40 to be ignored. Alternatively, different user inputs 40 to be ignored can be associated with different periods of time 42. Further, the period of time 42 can be customized to suit the reaction time of the user 24. The set of parameters 36 can be provided and/or adjusted by the user 24 (e.g., via application/system preferences). Alternatively, or in addition, the set of parameters 36 can be set by default by the application, operating system, etc., that caused the window 26 to assume the focus of the user interface 28.

The set of user inputs 40 to be ignored can be fixed or can be customized as necessary. To this extent, the set of user inputs 40 to be ignored can include a single input (e.g., the Escape or Enter key), a plurality of different inputs, or all possible inputs. For example, for a chat window that allows the user to press the Escape key to close the window, the set of user inputs 40 to be ignored could include just the Escape key. Alternatively, the set of user inputs 40 to be ignored for a chat window could include all keyboard input (including the Escape key) so that text being typed when the chat window unexpectedly appears does not become part of an instant message response.

In step S4, user input 46 is compared to predefined inputs 40 by analysis system 44, and if a predefined user input 40 is not found for a user input 46, then flow passes to step S6 where the user input 46 is passed on to the window 26 for processing. If a matching user input 40 is found for a user input 46, then in step S5 a delay system 48 compares the current system time 32 to the system time 32 obtained in step S2 to determine if the period of time 42 associated with the matching user input 40 has been exceeded or not. If the period of time 42 associated with the matching user input 40 has been exceeded, then in step S6 the user input 46 is passed on to the window 26 for processing. Flow then passes back to step S4. If the period of time 42 associated with the matching user input 40 has not yet been exceeded, then in step S7 the user input 46 is prevented from passing on to the window 26 for processing and flow returns to step S4 where the next user input 46 is compared to the set of user inputs 40 to be ignored. To this extent, user input 46 is effectively "hijacked" by the delay system 48 and "ignored" by the window 26 until the period of time 42 associated with the matching user input 40 has been exceeded.

In an optional step S8 (shown in phantom in FIG. 1), an indicating system 50 provides at least one type of signal 52 to the user 24 indicating that their user input 46 is being ignored. The signal 52 can comprise, for example, an auditory signal (e.g., a beep), a visual signal (e.g., a flashing menu bar), and/or any other type of signal 52 capable of capturing the attention of the user 24.

The present invention can be provided as a built-in service of an operating system or as part of a GUI system that controls the generation of windows. Alternatively, the present invention can be used or provided by applications independently of the operating system and GUI system. Other implementations are also possible.

A computer system 100 for implementing a method for preventing unwanted application behavior in accordance with an embodiment of the present invention is depicted in FIG. 3. Computer system 100 is provided in a computer infrastructure 102. Computer system 100 is intended to represent any type of computer system capable of carrying out the teachings of the present invention. For example, computer system 100 can be a laptop computer, a desktop computer, a workstation, a handheld device, a server, a cluster of computers, etc. In addition, as will be further described below, computer system 100 can be deployed and/or operated by a service provider that provides a service for preventing unwanted application behavior in accordance with the present invention. It should be appreciated that a user 24 can access computer system 100 directly, or can operate a computer system that communicates with computer system 100 over a network 106 (e.g., the Internet, a wide area network (WAN), a local area network (LAN), a virtual private network (VPN), etc). In the case of the latter, communications between computer system 100 and a user-operated computer system can occur via any combination of various types of communications links. For example, the communication links can comprise addressable connections that can utilize any combination of wired and/or wireless transmission methods. Where communications occur via the Internet, connectivity can be provided by conventional TCP/IP sockets-based protocol, and an Internet service provider can be used to establish connectivity to the Internet.

Computer system 100 is shown including a processing unit 108, a memory 110, a bus 112, and input/output (I/O) interfaces 114. Further, computer system 100 is shown in communication with external devices/resources 116 and one or more storage systems 118. In general, processing unit 108 executes computer program code, such as timer system 30, that is stored in memory 110 and/or storage system(s) 118. While executing computer program code, processing unit 108 can read and/or write data, to/from memory 110, storage system (s) 118, and/or I/O interfaces 114. Bus 112 provides a communication link between each of the components in computer system 100. External devices/resources 116 can comprise any devices (e.g., keyboard, pointing device, display (e.g., display 120, printer, etc.) that enable a user to interact with computer system 100 and/or any devices (e.g., network card, modem, etc.) that enable computer system 100 to communicate with one or more other computing devices.

Computer infrastructure 102 is only illustrative of various types of computer infrastructures that can be used to implement the present invention. For example, in one embodiment, computer infrastructure 102 can comprise two or more computing devices (e.g., a server cluster) that communicate over a network (e.g., network 106) to perform the various process steps of the invention. Moreover, computer system 100 is only representative of the many types of computer systems that can be used in the practice of the present invention, each of which can include numerous combinations of hardware/software. For example, processing unit 108 can comprise a single processing unit, or can be distributed across one or more processing units in one or more locations, e.g., on a client and server. Similarly, memory 110 and/or storage system(s) 118 can comprise any combination of various types of data storage and/or transmission media that reside at one or more physical locations. Further, I/O interfaces 114 can comprise any system for exchanging information with one or more external devices/resources 116. Still further, it is understood that one or more additional components (e.g., system software, communication systems, cache memory, etc.) not shown in FIG. 3 can be included in computer system 100. However, if computer system 100 comprises a handheld device or the like, it is understood that one or more external devices/resources 116 (e.g., a display) and/or one or more storage system(s) 118 can be contained within computer system 100, and not externally as shown.

Storage system(s) 118 can be any type of system (e.g., a database) capable of providing storage for information under the present invention. Such information can include, for example, sets of user inputs to be ignored and the period of time each user input is to be ignored. To this extent, storage system(s) 118 can include one or more storage devices, such as a magnetic disk drive or an optical disk drive. In another embodiment, storage system(s) 118 can include data distributed across, for example, a local area network (LAN), wide area network (WAN) or a storage area network (SAN) (not shown). Moreover, although not shown, computer systems operated by user 24 can contain computerized components similar to those described above with regard to computer system 100.

Shown in memory 110 (e.g., as a computer program product) is a timer system 30 for preventing unwanted application behavior in accordance with an embodiment of the present invention. The timer system 30 includes an analysis system 44, a delay system 48, and an indicating system 50.

When a trigger 22 (other than user 24) initiates the appearance or new focus of a window 26 in a user interface 28 displayed on display 120, the timer system 30 retrieves the current system time 32 from the computer clock 34. In addition, the timer system 30 obtains a set of parameters 36 associated with the window 26 (e.g., from storage system 118). The set of parameters 36 includes a set of one or more user inputs 40 to be ignored and the period of time 42 each user input 40 is to be ignored. The analysis system 44 compares the input 46 generated by the user 24 to the set of user inputs 40 to be ignored. If a matching user input 40 is found for a user input 46, then the delay system 48 determines, based on the current system time 32 and the system time obtained in response to the trigger 22, if the period of time 42 associated with the matching user input 40 has been exceeded. If the period of time 42 associated with the matching user input 40 has been exceeded, then the user input 46 is passed on to the window 26 for processing. If the period of time 42 associated with the matching user input 40 has not yet been exceeded, then the user input 46 is prevented from passing on to the window 26.

The indicating system 50 provides at least one type of signal 52 to the user 24 indicating that their user input 46 is being ignored. The signal 52 can comprise, for example, an auditory signal (e.g., a beep), a visual signal (e.g., a flashing menu bar), and/or any other type of signal capable of capturing the attention of the user 24.

The present invention can be offered as a business method on a subscription or fee basis. For example, one or more components of the present invention can be created, maintained, supported, and/or deployed by a service provider that offers the functions described herein for customers. That is, a service provider can be used to provide a service for preventing unwanted application behavior, as described above.

It should also be understood that the present invention can be realized in hardware, software, or any combination thereof. Any kind of computer/serve system(s)—or other apparatus adapted for carrying out the methods described herein—is suitable. A typical combination of hardware and software can include a general purpose computer system with a computer program that, when loaded and executed, carries out the respective methods described herein. Alternatively, a specific use computer, containing specialized hardware for carrying out one or more of the functional tasks of the invention, can be utilized. The present invention can also be embedded in a computer program product, which comprises all the respective features enabling the implementation of the methods described herein, and which—when loaded in a computer system—is able to carry out these methods.

The invention can take the form of an entirely hardware embodiment, an entirely software embodiment, or an embodiment containing both hardware and software elements. In a preferred embodiment, the invention is implemented in software, which includes but is not limited to firmware, resident software, microcode, etc.

The present invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, or transport the program for use by or in connection with the instruction execution system, apparatus, or device.

The medium can be an electronic, magnetic, optical, electromagnetic, infrared or a semiconductor system (or apparatus or device). Examples of a computer-readable medium include a semiconductor or solid state memory, magnetic tape, removable computer diskette, random access memory (RAM), read-only memory (ROM), rigid magnetic disk and optical disk. Current examples of optical disks include a compact disk—read only disk (CD-ROM), a compact disk-read/write disk (CD-R/W), and a digital versatile disk (DVD).

Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

What is claimed is:

1. A method for preventing unwanted application behavior, comprising:

determining when a window assumes a focus of a user interface; and preventing predetermined user input from being applied to the window for a predetermined period of time after the window assumes focus, wherein preventing a predetermined user input from being applied to the window further comprises:

obtaining a set of parameters associated with the window, wherein the set of parameters includes a set of user inputs to be ignored and a period of time each user input is to be ignored, and wherein different user inputs can be associated with different periods of time;

comparing a user input to the set of user inputs to be ignored;

preventing the user input from being applied to the window for the period of time, if a match is found in the comparing step; and applying the user input to the window if a match is not found in the comparing step.

2. The method of claim 1, wherein the step of preventing a predetermined user input from being applied to the window further comprises:

applying the user input to the window if a match is found in the comparing step and the period of time has expired.

3. The method of claim 1, wherein the period of time is adjustable.

4. The method of claim 1, further comprising:

informing a user that their user input has been prevented from being applied to the window.

5. The method of claim 4, wherein the step of informing a user further comprises:

providing a signal indicating that the user input has been prevented from being applied to the window.

6. The method of claim 5, wherein the signal is selected from the group consisting of a visual signal and an auditory signal.

7. Deploying an application for preventing unwanted application behavior, comprising:

providing a computer infrastructure being operable to perform the method of claim 1.

8. A system for preventing unwanted application behavior, comprising:

at least one computer, including:

a system for determining when a window assumes a focus of a user interface; and a system for preventing predetermined user input from being applied to the window for a predetermined period of time after the window assumes focus, wherein the system for preventing a predetermined user input from being applied to the window further comprises:

a system for obtaining a set of parameters associated with the window, wherein the set of parameters includes a set of user inputs to be ignored and a period of time each user input is to be ignored,. and wherein different user inputs can be associated with different periods of time;

a system for comparing a user input to the set of user inputs to be ignored;

a system for preventing the user input from being applied to the window for the period of time, if a match is found by the system for comparing; and a system for applying the user input to the window if a match is not found by the system for comparing.

9. The system of claim 8, wherein the system for preventing a predetermined user input from being applied to the window further comprises:

a system for applying the user input to the window if a match is found and the period of time has expired.

10. The system of claim 8, wherein the period of time is adjustable.

11. The system of claim 8, further comprising:

a system for informing a user that their user input has been prevented from being applied to the window.

12. The system of claim 11, wherein the system for informing a user further comprises:

a system for providing a signal indicating that the user input has been prevented from being applied to the window.

13. The system of claim 12, wherein the signal is selected from the group consisting of a visual signal and an auditory signal.

14. A program product stored on a computer readable medium for preventing unwanted application behavior, the computer readable medium comprising program code for performing, when executed on a computer system, the steps of:

determining when a window assumes a focus of a user interface; and preventing predetermined user input from being applied to the window for a predetermined period of time after the window assumes focus, wherein preventing a predetermined user input from being applied to the window further comprises:

obtaining a set of parameters associated with the window, wherein the set of parameters includes a set of user inputs to be ignored and a period of time each user input is to be ignored, and wherein different user inputs can be associated with different periods of time;

comparing a user input to the set of user inputs to be ignored;

preventing the user input from being applied to the window for the period of time, if a match is found in the comparing step; and applying the user input to the window if a match is not found in the comparing step.

* * * * *